United States Patent [19]
Arian et al.

[11] Patent Number: 5,692,537
[45] Date of Patent: Dec. 2, 1997

[54] ADJUSTABLE HYDRAULIC CONTROL VALVE MODULE

[75] Inventors: Abbas Arian, Houston, Tex.; Jacques Maissa, Roswell, N. Mex.

[73] Assignee: Western Atlas International, Inc., Houston, Tex.

[21] Appl. No.: 533,214

[22] Filed: Sep. 22, 1995

[51] Int. Cl.$^6$ .................................................. G05D 7/06
[52] U.S. Cl. .................... 137/486; 137/487.5; 137/492.5
[58] Field of Search ............................. 137/486, 492.5, 137/529, 495, 487.5

[56] References Cited

U.S. PATENT DOCUMENTS

| | | | |
|---|---|---|---|
| 4,333,486 | 6/1982 | Ciccozzi | 137/486 X |
| 4,386,626 | 6/1983 | Hehl | 137/529 |
| 4,540,018 | 9/1985 | Dantlgraber | 137/529 X |
| 4,548,233 | 10/1985 | Wölfges | 137/529 |

FOREIGN PATENT DOCUMENTS 2255528  7/1975  France ................................. 137/529

*Primary Examiner*—Stephen M. Hepperle
*Attorney, Agent, or Firm*—Alan J. Atkinson

[57] ABSTRACT

An adjustable valve for controlling fluid flow between an inlet and an outlet in a valve. A compressed spring biases a valve member against the valve inlet to prevent fluid flow until the fluid pressure reaches a certain level. One end of the spring contacts a hydraulic plunger which is moved with a hydraulic fluid. The hydraulic fluid pressure can be raised to increase the spring force acting against the valve element, and the hydraulic fluid pressure can be reduced to decrease the spring force acting against the valve element. The flow rate at the valve outlet can be monitored, and flow rate signals can be transmitted to a controller for adjusting the hydraulic fluid pressure in response to the flow rate detected.

9 Claims, 3 Drawing Sheets

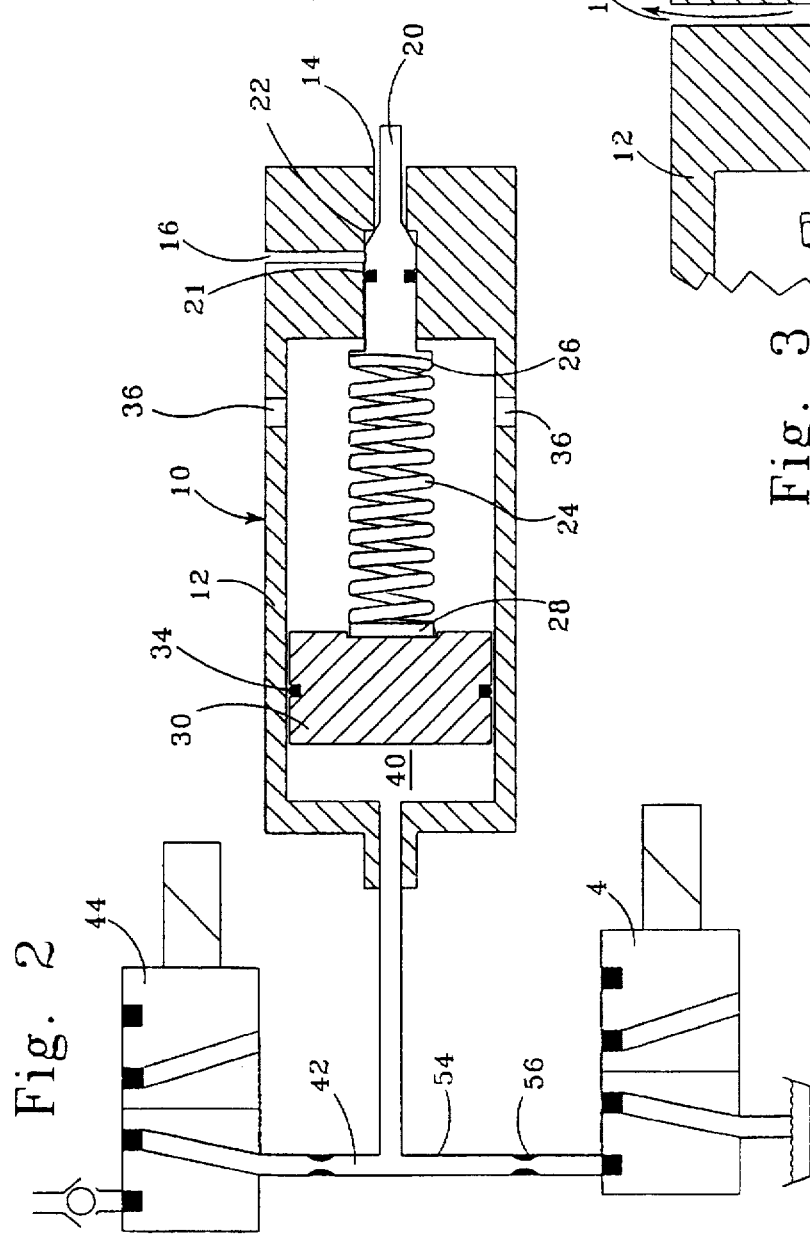
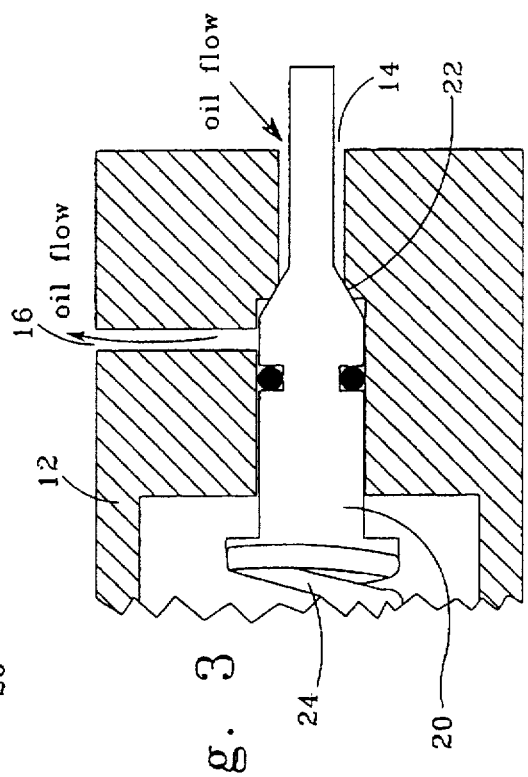

ADJUSTABLE HYDRAULIC CONTROL VALVE MODULE

BACKGROUND OF THE INVENTION

The present invention relates to an adjustable valve for controlling fluid flow between a valve inlet and outlet. More particularly, the present invention relates to a hydraulic control apparatus and method for selectively adjusting the mechanical force acting to bias a valve member against a valve seat to control fluid flow through the valve and to maintain a constant load pressure.

Valves regulate fluid flow through pipes and other conduits and selectively release excess pressure from conduits or containers. Pressure regulating valves can control fluid flow through the valve or can control the fluid pressure on the upstream or downstream sides of the valve. Such valves can regulate the time, rate, quantity, or duration of fluid flow. Other valves such as check valves or pressure relief valves can open to release fluid when the fluid pressure exceeds a selected level.

Valves regulate fluid flow by moving a reciprocating valve element into contact with a stationary valve seat. Many valves incorporate a compression spring to bias the valve element against the valve seat to prevent fluid flow. U.S. Pat. No. 170,974 to Westwater (1875) shows a spring which biases a plunger valve element against a valve seat in a check valve. Similarly, U.S. Pat. Nos. 1,692,795 to Clifford (1927), and 1,860,004 to Yardly (1931), and 2,233,649 to Stahl et al. (1941), and 2,447,729 to Bertea (1948), and 4,860,995 to Rogers (1989) show spring biased valve elements which contact a valve seat.

As illustrated in these patents, known valves use a mechanical compression spring to bias a valve element against a valve seat to prevent fluid flow through the valve. To increase the force exerted by the spring, the compression springs are tightened with a retaining nut or threaded housing to shorten the length of the springs. To decrease the force exerted by the spring, the compression springs are loosened to increase the length of the springs. If the elasticity of the spring changes due to temperature changes or to fatigue of the spring, mechanical adjustment of the spring is required. The mechanical adjustment of the springs complicates efforts to automate the spring adjustment function, and increases the cost of automated systems accordingly.

A need, therefore, exists for an improved valve that is adjustable to control fluid flow between an inlet and an outlet in a valve. The valve should be easy to manufacture and should permit precise regulation of the force exerted by a spring against a valve element.

SUMMARY OF THE INVENTION

The present invention provides an adjustable valve for controlling fluid between an inlet and an outlet. A valve member selectively blocks the valve inlet to impede fluid flow to the valve outlet. A spring has a first end in contact with the valve member and is compressible in response to fluid pressure increases acting against the valve member. A second end of the spring contacts a piston movable in response to pressure changes in a hydraulic fluid in contact with the piston, and an actuator selectively pressurizes the hydraulic fluid to move the piston and to change the spring force exerted against the valve member.

In other embodiments of the invention, a valve system for controlling fluid flow comprises a housing having an inlet and outlet, a cylindrical chamber within the housing, a valve member for selectively blocking fluid flow through the housing inlet, a piston within the cylindrical chamber, a hydraulic fluid in contact with the piston, and a hydraulic pressure actuator for selectively pressurizing the hydraulic fluid to move the piston and to change the spring force.

The method of the invention is practiced by positioning a valve member in contact with the pressurized fluid, by positioning a compressed spring to create a spring force against the valve member, by positioning a hydraulic plunger in contact with the compressed spring, and by changing the pressure of a hydraulic fluid in contact with the piston to modify the position of the piston and to change the spring force exerted against the valve member.

BRIEF DESCRIPTION OF THE DRAWINGS

FIG. 2 illustrates an embodiment of the invention wherein the pressure of the hydraulic oil has been increased to move the piston.

FIG. 3 illustrates an embodiment of the invention showing the detail of a valve plunger when the fluid pressure at the valve inlet generates a force exceeding the spring force exerted by the spring.

DESCRIPTION OF THE PREFERRED EMBODIMENTS

Figure 1:
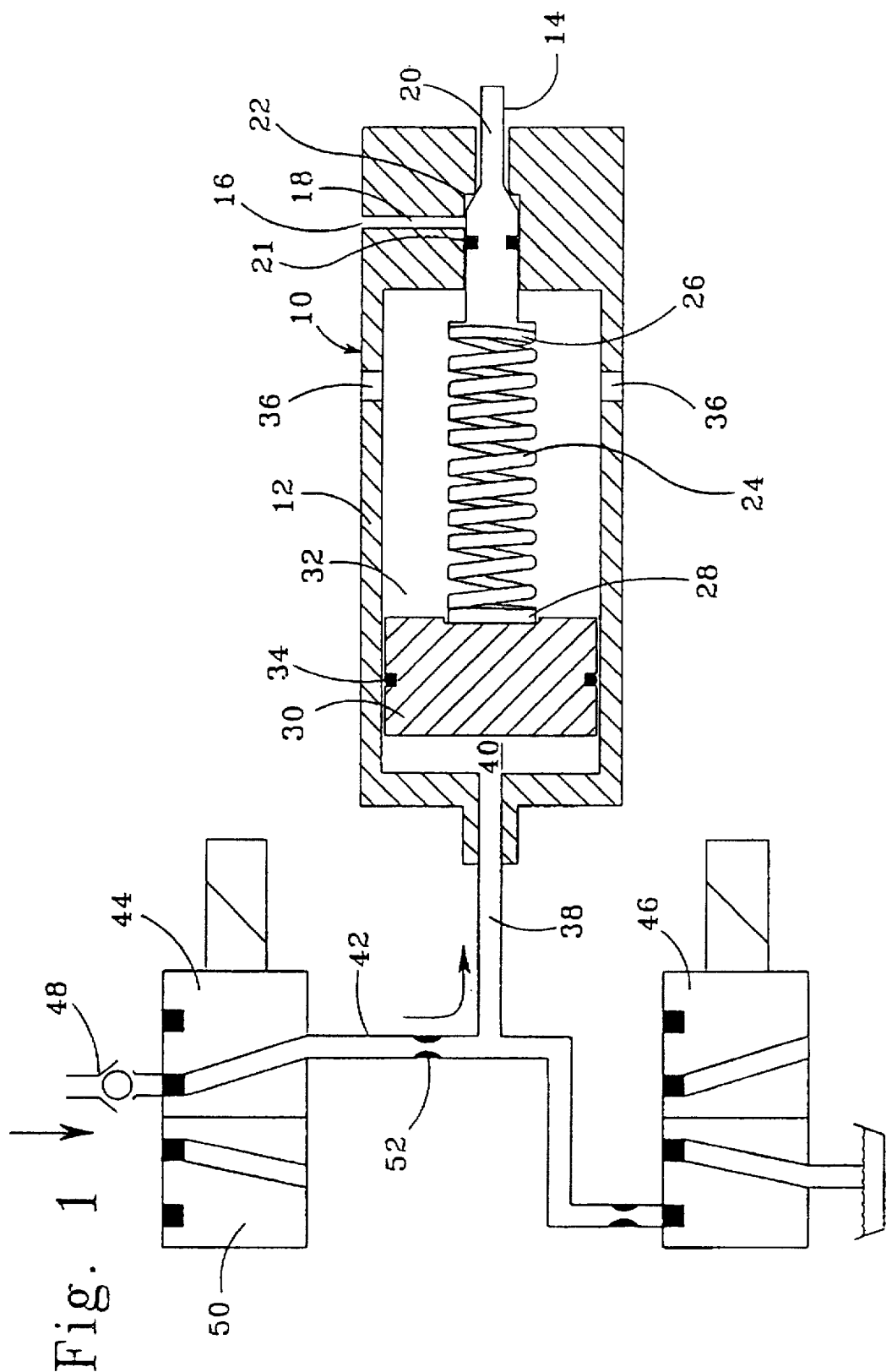
FIG. 1 illustrates one embodiment of the invention wherein a valve member is held in contact against a valve seat.

The present invention provides an improved valve for controlling fluid flow through a valve. FIG. 1 illustrates valve 10 comprising housing 12, valve inlet 14 and valve outlet 16. Passage 18 provides a fluid communication path between valve inlet 14 and valve outlet 16, and valve element or member 20 and seal 21 selectively block such fluid communication path by contacting valve seat 22 to form a leak tight seal therebetween.

Compression spring 24 is in compression and provides a spring force which biases valve member 20 against valve seat 22. First end 26 of spring 24 contacts valve member 20, and second end 28 of spring 24 contacts piston 30. Piston 30 is illustrated as a cylindrical member which reciprocates within cylindrical chamber 32 of housing 12. Seal 34 provides for reciprocating movement between piston 30 and housing 12 while providing a dynamic seal to prevent fluid or pressure leakage. If desired, housing 12 can have apertures 36 to prevent pressure variations in cylindrical chamber 32 between piston 30 and valve member 20.

Port 38 is located at one end of housing 12, and hydraulic fluid 40 is positioned within cylindrical chamber 32 in contact with piston 30 and with port 38. Port 38 is connected to hydraulic line 42 which leads to first actuator 44 and second actuator 46. In one embodiment of the invention, first actuator 44 includes check valve 48 and solenoid valve 50 engaged with line 42. Flow restricter 52 can be positioned within hydraulic line 42 to modify the flow rate of hydraulic fluid 40 from first actuator 44 to pressurize piston 30.

Referring to FIG. 2, hydraulic line 54 connects with hydraulic line 42 and conveys hydraulic fluid 40 to second actuator 46. Flow restricter 56 can be positioned within hydraulic line 54. The pressure of hydraulic fluid 40 is greater than in FIG. 1, as indicated by the position of piston 30 within cylindrical chamber 32. This position compresses spring 24 by reducing the length between first end 26 and second end 28 of spring 24, and therefore causes spring 24 to exert a greater spring force against valve member 20. As shown in FIG. 2, first actuator 44 and second actuator 46 are disengaged from modifying the pressure of hydraulic fluid 40. In this condition, spring 24 will bias valve member 20 against valve seat 22 in a manner similar to conventional check valves.

FIG. 3 illustrates detail of valve member 20 when the inlet force exerted by the fluid exceeds the counteracting spring force exerted by spring 24. As shown, valve member 20 is unseated from contact with valve seat 22 and permits the fluid to flow from valve inlet 14 to valve outlet 16. This fluid flow occurs while the spring force exerted by spring 24 is maintained to control the pressure of the fluid.

Figure 4:
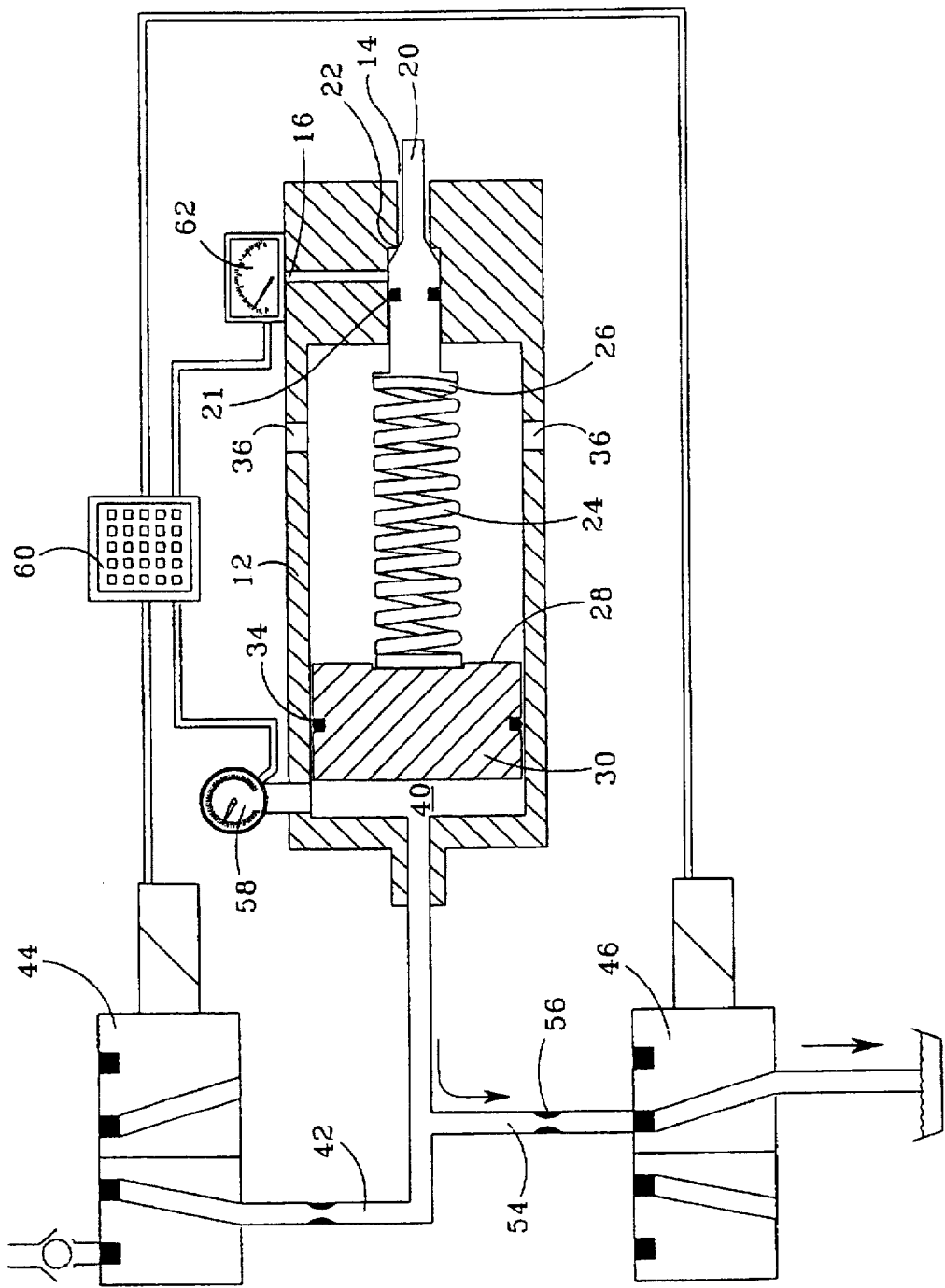
FIG. 4 illustrates an embodiment of the invention wherein the pressure of the hydraulic fluid is reduced.

FIG. 4 illustrates the operation of second actuator 46 when the pressure of hydraulic fluid 40 in contact with piston 30 is being reduced. As shown, first actuator 44 is stationary, and second actuator 46 is operated to bleed hydraulic fluid 40 from hydraulic line 54. As the pressure of hydraulic fluid 40 is reduced, spring 24 will push piston 30 against hydraulic fluid 40 until an equilibrium condition is reached. By lengthening spring 24, the spring force exerted by spring 24 is reduced.

In different embodiments of the invention, the pressure of hydraulic fluid 40 can be monitored with guage 58 and can be communicated to controller 60. In one embodiment of the invention, controller 60 is engaged with first actuator 44 and second actuator 46. Additionally, the flow rate or pressure of the fluid at valve outlet 16 can be detected with meter 62 so that signals can be communicated to controller 60. As the flow rate or pressure of the fluid is monitored, controller 60 can be operated to control first actuator 44 and second actuator 46 to adjust the pressure of hydraulic fluid 40. In this embodiment of the invention, piston 30 can be continuously adjusted to provide real time control over the fluid flow through valve outlet 16.

In other embodiments of the invention, first actuator 44 and second actuator 46 can be replaced with a single actuator or other equipment sufficient to manually or automatically control the pressure of hydraulic fluid 40. Different combinations of the components described above can be made to accomplish the novel purpose of controlling hydraulic fluid pressure to automatically adjust the force biasing a valve element against the valve seat. In different embodiments of the invention, the valve element can function as a check valve that unseats from the valve seat when contacted by a selected fluid pressure. In another embodiment of the invention, the valve element can function as a continuous control pressure relief valve that regulates fluid flow or fluid pressure through the valve on a continuous basis. Such a continuous regulator is useful in many different applications such as in the regulation of fluid power used in bit coring operations in wells.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An adjustable valve for controlling fluid flow between an inlet and an outlet, comprising:

a valve member for selectively blocking said inlet to impede fluid flow from said inlet to said outlet;

a spring having first and second ends, wherein said first end exerts a spring force against said valve member to urge said valve member to selectively block said inlet, and wherein said spring is compressible in response to a fluid pressure increase, acting against said valve member at said inlet, to permit the fluid to flow from said inlet to said outlet;

a hydraulic fluid;

a piston having a first end in contact with said hydraulic fluid and having a second end in contact with the second end of said spring;

a hydraulic pressure actuator for selectively pressurizing said hydraulic fluid to move said piston and to change the spring force exerted by said spring against said valve member;

a flow meter for detecting fluid flow at said outlet; and a controller engaged with said flow meter and with said pressure actuator for operating said actuator in response to the fluid flow rate detected by said flow meter.

2. An adjustable valve as recited in claim 1, further comprising a piston housing having a cylindrical chamber, and wherein said piston is reciprocable within said cylindrical chamber.

3. An adjustable valve as recited in claim 1, wherein said spring is positioned within a portion of said cylindrical chamber that is not in contact with said hydraulic fluid, and further comprising ports through said cylindrical chamber to permit ambient air to contact said spring.

4. An adjustable valve as recited in claim 1, wherein said hydraulic pressure actuator comprises a first valve for increasing the pressure of said hydraulic fluid, and further comprises a second valve for reducing the pressure of said hydraulic fluid.

5. An adjustable valve as recited in claim 1, further comprising a gauge for monitoring the pressure of said hydraulic fluid, wherein said gauge is engaged with said controller for communicating said hydraulic fluid pressure to said controller.

6. A valve system for controlling fluid pressure through the valve system, comprising:

a housing having an inlet and having an outlet in fluid communication with said inlet, and wherein said housing further includes a cylindrical chamber;

a valve member for selectively blocking said inlet to impede fluid flow from said inlet to said outlet;

a spring having first and second ends, wherein said first end exerts a closing force against said valve member to urge said valve member to selectively block said inlet, and wherein said spring is compressible in response to a fluid pressure increase, acting against said valve member at said inlet, to permit the fluid to flow from said inlet to said outlet;

a hydraulic fluid;

a piston within said cylindrical chamber and having a first end in contact with said hydraulic fluid and having a second end in contact with the second end of said spring;

a hydraulic pressure actuator for selectively pressurizing said hydraulic fluid to move said piston and to change the closing force exerted by said spring against said valve member;

a flow meter for detecting the fluid flow rate at said outlet; and a controller engaged with said flow meter and with said pressure actuator for operating said actuator in response to the fluid flow rate detected by said flow meter.

7. A method for controlling pressurized fluid flow from an inlet to an outlet in a housing, comprising the steps of:

- positioning a valve member in contact with said pressurized fluid to block fluid flow between said inlet and said outlet;
- positioning a compressed spring in contact with said valve member to create a spring force holding said valve member in contact with said inlet, wherein increases in the fluid pressure displaces said valve member from contact with said inlet to permit fluid flow between the inlet and the outlet;
- positioning a hydraulic plunger in contact with said compressed spring, wherein said hydraulic plunger is movable by modifying the pressure of a hydraulic pressure fluid in contact with said hydraulic plunger;
- changing the spring force exerted against said valve member by operating an actuator to modify the pressure of said hydraulic pressure fluid in contact with said hydraulic plunger;
- positioning a controller in combination with said actuator; and
- operating a flow meter in engagement with the fluid and with said controller to generate fluid flow rate measurements; and
- operating said controller to detect measurements generated by said flow meter and to control said actuator in response to the fluid flow rate.

8. A method as recited in claim 7, wherein the pressure of said hydraulic pressure fluid is increased by said actuator to selectively reduce the flow rate of the pressurized fluid from flowing from said inlet to said outlet.

9. A method as recited in claim 7, wherein the pressure of said hydraulic pressure fluid is selectively modified by said actuator to regulate the pressure of the pressurized fluid flowing from said inlet to said outlet.

* * * * *